(12) United States Patent
Mohr et al.

(10) Patent No.: US 8,245,589 B2
(45) Date of Patent: Aug. 21, 2012

(54) DEVICE FOR ACTUATING A GEARWHEEL, WHICH IS DESIGNED AS A LOOSE WHEEL, OF A TRANSMISSION DEVICE

(75) Inventors: Mark Mohr, Tettnang (DE); Matthias Reisch, Ravensburg (DE); Ralf Dreibholz, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 530 days.

(21) Appl. No.: 12/443,037

(22) PCT Filed: Oct. 2, 2007

(86) PCT No.: PCT/EP2007/060456
§ 371 (c)(1),
(2), (4) Date: Mar. 26, 2009

(87) PCT Pub. No.: WO2008/046736
PCT Pub. Date: Apr. 24, 2008

(65) Prior Publication Data
US 2010/0043586 A1 Feb. 25, 2010

(30) Foreign Application Priority Data
Oct. 19, 2006 (DE) .......................... 10 2006 049 274

(51) Int. Cl.
*F16H 3/083* (2006.01)
(52) U.S. Cl. ........................................... 74/372; 74/371
(58) Field of Classification Search ............... 74/473.36, 74/473.37, 473.12, 371, 372
See application file for complete search history.

(56) References Cited

U.S. PATENT DOCUMENTS

| 3,463,028 | A | * | 8/1969 | Polidor | .......................... 74/366 |
| 5,689,998 | A | * | 11/1997 | Lee | ................................. 74/371 |
| 6,065,361 | A | * | 5/2000 | Martin et al. | .................... 74/371 |
| 6,978,692 | B2 | | 12/2005 | Thery | |
| 6,993,991 | B2 | | 2/2006 | Baasch et al. | |
| 8,001,865 | B2 | * | 8/2011 | Muller | ............................. 74/372 |
| 2003/0200829 | A1 | | 10/2003 | Vukovich et al. | |
| 2010/0071497 | A1 | * | 3/2010 | Reisch et al. | ............... 74/473.12 |

FOREIGN PATENT DOCUMENTS

| DE | 4325964 A1 | 1/1995 |
| DE | 19851738 A1 | 5/2000 |
| DE | 19921064 A1 | 11/2000 |
| DE | 10206584 A1 | 9/2003 |
| DE | 10302502 A1 | 9/2004 |
| EP | 0391604 A2 | 10/1990 |
| EP | 1357317 A2 | 10/2003 |
| WO | 2005/036007 A1 | 4/2005 |
| WO | WO 2007099034 A1 * | 9/2007 |

* cited by examiner

*Primary Examiner* — David D Le
*Assistant Examiner* — Terence Boes
(74) *Attorney, Agent, or Firm* — Davis & Bujold, P.L.L.C.

(57) ABSTRACT

A device (4) for actuating a component mounted to rotate on a shaft (3), preferably a gearwheel (3A to 3D) made as a loose wheel of a transmission device (1). The component can be shifted by an engaging device (4A, 4B) that includes at least one electric actuator (5, 17) to an engaged condition in which the component is connected in a rotationally fixed manner to the shaft (3), and such that the component can be acted upon with the actuation force needed for its engagement or disengagement from inside the shaft (3) outwardly. The electric actuator (5, 17) is at least partially arranged inside the shaft (3).

15 Claims, 2 Drawing Sheets

DEVICE FOR ACTUATING A GEARWHEEL, WHICH IS DESIGNED AS A LOOSE WHEEL, OF A TRANSMISSION DEVICE

This application is a National Stage completion of PCT/EP2007/060456 filed Oct. 2, 2007, which claims priority from German patent application serial no. 10 2006 049 274.9 filed Oct. 19, 2006.

FIELD OF INVENTION

The invention concerns a device for actuating a gearwheel designed as a loose wheel of a transmission device.

BACKGROUND OF THE INVENTION

In step-down transmissions known from practice, to engage or disengage gearwheels designed as loose wheels, as a rule shift elements such as synchronizers, claw or frictional elements are actuated by means of shift forks or shift rockers which, in relation to the shaft carrying the loose wheel or a plurality of loose wheels, act upon the shift elements from the outside. In such a case a minimum distance between two loose wheels arranged next to one another, which can be actuated by a common shift element, is determined among other things by the width of a shift sleeve and in addition by the shift path that the shift sleeve has to cover in order to engage the two loose wheels.

Disadvantageously, step-down transmissions in which shift elements are actuated from outside take up a lot of space in the radial direction, such space being of only limited availability especially in automobiles.

To reduce the radial space taken up by a transmission, a change has been made toward actuating shift elements of transmission devices such as double-clutch transmissions, automated variable-speed transmissions or planetary transmissions, from the inside of a shaft carrying loose wheels extend outward, so that from DE 102 06 584 A1, DE 43 25 964 A1 and DE 103 02 502 A1 various systems are known for actuating shift elements extending outward from a shaft by means of a hydraulic, pneumatic, mechanical and/or electromechanical control system.

In mechanical or electromechanical actuating systems known from the prior art for a shift element provided for engaging or disengaging a gearwheel designed as a loose wheel, it is provided for example that the shift element is actuated by a rod passing through the shaft. On the circumferential side of the shaft or the gearset comprising the loose wheel a suitable shift system for producing an H-shift pattern or for electrical actuation is required, but this increases the manufacturing costs and the weight of a transmission device to an undesired extent. Furthermore, the shift system arranged in the circumferential area of a shaft takes up a lot of structural space in the radial direction and also causes friction losses.

SUMMARY OF THE INVENTION

Accordingly, the purpose of the present invention is to provide a device for actuating a component mounted to rotate on a shaft, preferably a gearwheel designed to be a loose wheel of a transmission device, which can be produced simply and inexpensively, takes up little structural space and has low component weight, and whose use enables a transmission to be operated with good efficiency.

In the device according to the invention for actuating a component mounted to rotate on a shaft, preferably a gearwheel of a transmission device, made as a loose wheel, this component being able to be manipulated, by at least one engaging device that comprises an electric actuator, to an engaged condition in which the first gearwheel is connected in rotationally fixed manner to the shaft, such that the first gearwheel can be acted upon with the actuation force required for its engagement or disengagement from inside the shaft outward, the at least one electric actuator is arranged at least partially inside the first shaft.

In this way, structural space available in conventional transmission devices inside shafts that carry loose gearwheels, which shafts are often made centrally hollow in order to save weight, is in a simple manner utilized by arranging in this area at least one electric actuator provided for the actuation of a gearwheel made as a loose wheel, so that the structural space required for the transmission device is reduced in the radial and/or the axial direction in a simple manner.

The use of the electric actuator and the arrangement of the actuator on the inside of the shaft carrying the loose wheel to be actuated makes it possible in a simple manner to do without any external shifting means known from the prior art, and thus to save structural space in the circumferential area of the shaft. Furthermore, thanks to the structurally more simple design of the engaging device compared with conventional transmission devices, the overall weight of the transmission device is also reduced. In addition, compared with shift systems known from the prior art frictional losses during the actuation of a loose wheel are reduced, due to the smaller diameter range within which an actuation or a transmission of the loose wheel actuating force required for engagement or disengagement of the wheel takes place.

In an advantageous further development of the device according to the invention, the electric actuator is connected in a rotationally fixed manner to a housing of the transmission device, whereby energy exchange and data transfer between the electric actuator and components of a transmission device or of another system comprising the device according to the invention, which are fixed on the housing and which co-operate with the actuator, such as a wedge brake system, can be effected in a simple manner.

Alternatively, in a further advantageous embodiment of the device according to the invention it is provided that the electric actuator is connected in a rotationally fixed manner to the shaft carrying the rotating component, and therefore rotates at the speed of the shaft during operation. This offers the advantage that the electric actuator can be inserted into the shaft before the shaft is fitted into a housing, forming a pre-assembled module with the shaft which, during final assembly of a transmission device or other system, can be fitted into a housing in a single assembly step. In addition, with this design the correct operation of the device can be tested using appropriate testing means outside the housing of the transmission device or other system.

Another advantageous embodiment of the device for actuating a component mounted to rotate on a shaft, preferably a gearwheel made as a loose wheel, is characterized by a drive converter device of the engagement device arranged between the actuator and the component, by means of which a rotary drive of the actuator can be converted into a translational drive movement inside the shaft in a manner advantageous in terms of structural space.

In a further development of the above embodiment of the device according to the invention, the drive converter device is made as a spindle-nut arrangement with or without self-locking, by which the rotary drive of the actuator can be converted by simply designed means and in an inexpensive manner into a translational drive movement for producing the actuation force needed to engage or disengage the component.

To keep the drive power of the electric motor and hence its space requirement as small as possible, an advantageous embodiment of the device according to the invention is made with a transmission, preferably a planetary transmission 22 (FIG. 1), between the actuator and the drive converter device, by means of which the drive power of the electric actuator can be transformed to a value necessary for actuating the component.

In a further advantageous embodiment of the device according to the invention, the electric actuator is made as an electric motor by means of which, preferably, an existing shift status of the component can be maintained, so that there is no need for additional structural elements to maintain the shift status of the component.

Alternatively, in a further advantageous design of the device according to the invention it is provided that an electrically controlled brake is associated with the actuator to maintain the shift status of the component, this brake preventing any change of the component's shift status when it is not energized.

Depending on the design of the component to be actuated by the actuator, the actuator can be controlled and/or regulated as a function of an existing shift status of the component and/or of a currently necessary drive power. For example, if driving the actuator actuates a shift claw that engages a loose wheel of a transmission device, then the actuator's operation is controlled and/or regulated depending on the current position of the shift claw. If a frictional disk-type shift element of a transmission is controlled by the actuator, then the drive power of the actuator is adjusted under control and/or regulation since the torque that can be transmitted by a disk-type shift element depends on the actuating force applied to its frictional elements.

BRIEF DESCRIPTION OF THE DRAWINGS

Other advantages and advantageous further developments of the invention emerge from the claims and the example embodiments described in principle with reference to the drawing. For the sake of clarity, in the description of the various example embodiments components having the same structure and function are indexed in the same way. The drawings show:

DETAILED DESCRIPTION OF THE PREFERRED EMBODIMENTS

Figure 1:
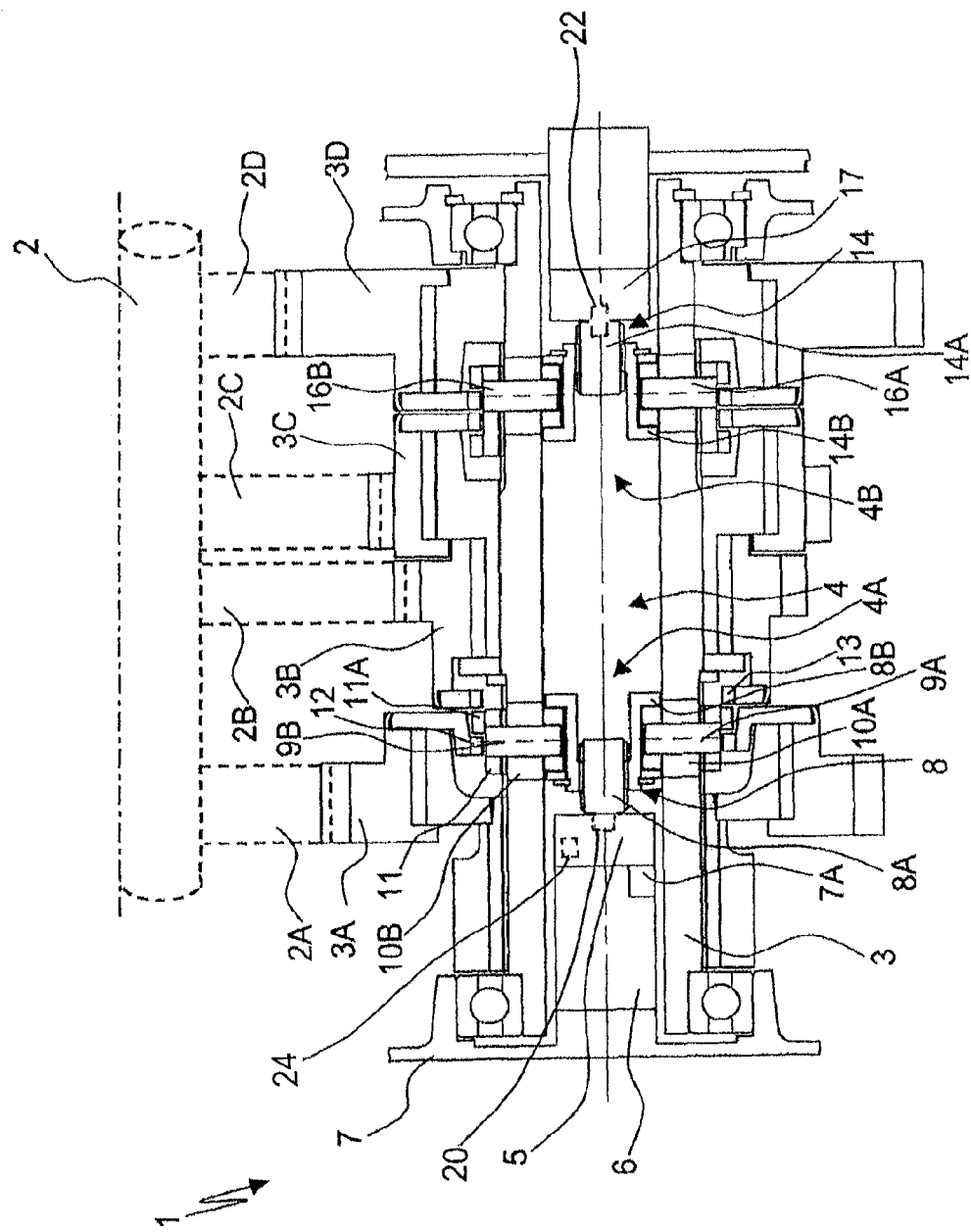
FIG. 1: A schematic partial longitudinal section view of a first example embodiment of a device according to the invention, arranged in a step-down transmission.

FIG. 1 shows part of a transmission device 1 made as a step-down transmission, seen in a longitudinal section view, which comprises a main transmission shaft 2 and arranged parallel to it, a countershaft 3. On the main transmission shaft 2 are arranged a plurality of gearwheels 2A to 2D made as fixed wheels, which mesh with a plurality of gearwheels 3A to 3D mounted to rotate on the countershaft and made as loose wheels. The loose wheels 3A and 3B can be engaged by means of a first engaging device 4A of a device 4 for actuating the gearwheels 3A to 3D, whereas the loose wheels 3C and 3D can be engaged and thus connected in a rotationally fixed manner to the countershaft 3 by means of a second engaging device 4B of the device 4.

The engaging devices 4A and 4B of the device 4 have basically the same structure, so in the description of FIG. 1 below, essentially only the engaging device 4A will be described.

The engaging device 4A is made with an electric actuator 5 in this case consisting of an electric motor and, associated with the electric actuator 5, a control and power electronic unit 6, both of which are connected in a rotationally fixed manner to a housing component 7 of the housing of the transmission device 1. A motor output shaft (not shown) of the electric actuator 5 is connected in a rotationally fixed manner to a spindle 8A of a spindle-nut arrangement 8, so that when the actuator drives the spindle 8A it rotates and a nut 8B engaged with the spindle, which is prevented from rotating by anti-rotation means (also not shown), is moved in the axial direction of the countershaft 3 away from the electric actuator 5 or toward it.

In this case the nut 8B is actively connected to two pins 9A and 9B that pass through the countershaft 3 in such manner that the pins 9A and 9B are pushed by the nut 8B in the axial direction of the countershaft 3 along slots 10A, 10B of the countershaft 3. During operation of the countershaft 3 the pins 9A and 9B rotate at the speed of the countershaft 3 about the rotation axis of the countershaft 3, whereas the nut 8B cannot rotate. This means that in the area between the pins 9A and 9B and the nut 8B for actuating the loose wheels 3A and 3B, speed decoupling means are provided.

To be able to couple the loose wheel 3A or the loose wheel 3B in a rotationally fixed manner to the countershaft 3 and so change it from a disengaged to an engaged condition, the pins 9A and 9B are connected at their end remote from the nut 8B to a sleeve element 11 that surrounds the countershaft 3 and which is connected in a rotationally fixed manner to the countershaft 3 by a form-locking connection but which can move along the countershaft 3 in the axial direction of the countershaft 3. Furthermore, in the area of its circumferential surface facing away from the countershaft 3 the sleeve element 11 is has a toothed profile 11A which, depending on its axial position, engages with a toothed profile 12 connected fixed to the loose wheel 3A, or with a toothed profile 13 connected fixed to the loose wheel 3B, or is in a neutral, intermediate position between the two toothed profiles 12 and 13 and engages with neither of them, so that neither the loose wheel 3A nor the loose wheel 3B is connected in a rotationally fixed manner to the countershaft 3. The spindle-nut arrangement 8 and the spindle-nut arrangement 14 in each case constitute a drive conversion device by means of which rotary drive of an electric actuator can be converted to translational drive movement for engaging or disengaging the loose wheels 3A to 3D.

To avoid spontaneous engagement or disengagement of one of the loose wheels 3A to 3D, in this case the spindle-nut arrangements 8 and 14 are of self-locking design so that without being driven by the actuator the nut 8B of the spindle-nut arrangement 8 or the nut 14B of the spindle-nut arrangement 14 will hold their position.

Alternatively to the above, in other embodiments (not shown in the drawing) of the device for actuating a component mounted to rotate on a shaft or a gearwheel of a transmission device, made as a loose wheel, it is provided that a shift status of the component can be maintained by appropriate control of the electric actuator of the engaging device by means of a retaining torque produced by the actuator.

In addition or alternatively, it can also be provided that to maintain the shift status of the component, for example a loose wheel, an electrically controlled brake is associated with the actuator, which prevents a change of the component's shift status when it is not energized. When the electric actuator is made as an electric motor the brake 24 is connected to the motor output shaft, so that rotary movement of a spindle of a spindle-nut arrangement is prevented when the electric motor is not energized.

Inside the countershaft 3, besides the electric actuator 5 and its associated control and power electronic unit 6 an energy accumulator 7 for the storage of electrical energy is also provided, which in the present case is in the form of a capacitor by means of which a voltage supplied to the electric actuator is smoothed. In addition or alternatively, the energy accumulator 7 preferably in the form of a capacitor can also be used for the interim storage of electrical energy needed for operating the electric actuator 5.

Moreover, the structural unit constituting a module and containing the energy accumulator 7, the control and power electronic unit 6 and the electric actuator 5, is also provided with oil ducts 20 through which, inside the countershaft 3, hydraulic fluid for lubrication, cooling or actuating various components of the transmission device 1 is passed to the components concerned.

In a further development of the step-down transmission 1 illustrated in FIG. 1 the device 4 for actuating the loose wheels 3A to 3D which comprises the engaging devices 4A and 4B, is formed in the area between the electric actuator 5 and the spindle-nut arrangement 8 and an electric actuator 17 and the spindle-nut arrangement 14, in a manner not illustrated, in each case with a transmission device in order to be able to transform the drive power of the electric actuator 5 by the necessary amount and to be able to drive the spindle 8A and a spindle 14A, respectively, with the torque required for the axial displacement of the spindle nuts 8B and 14B.

Figure 2:
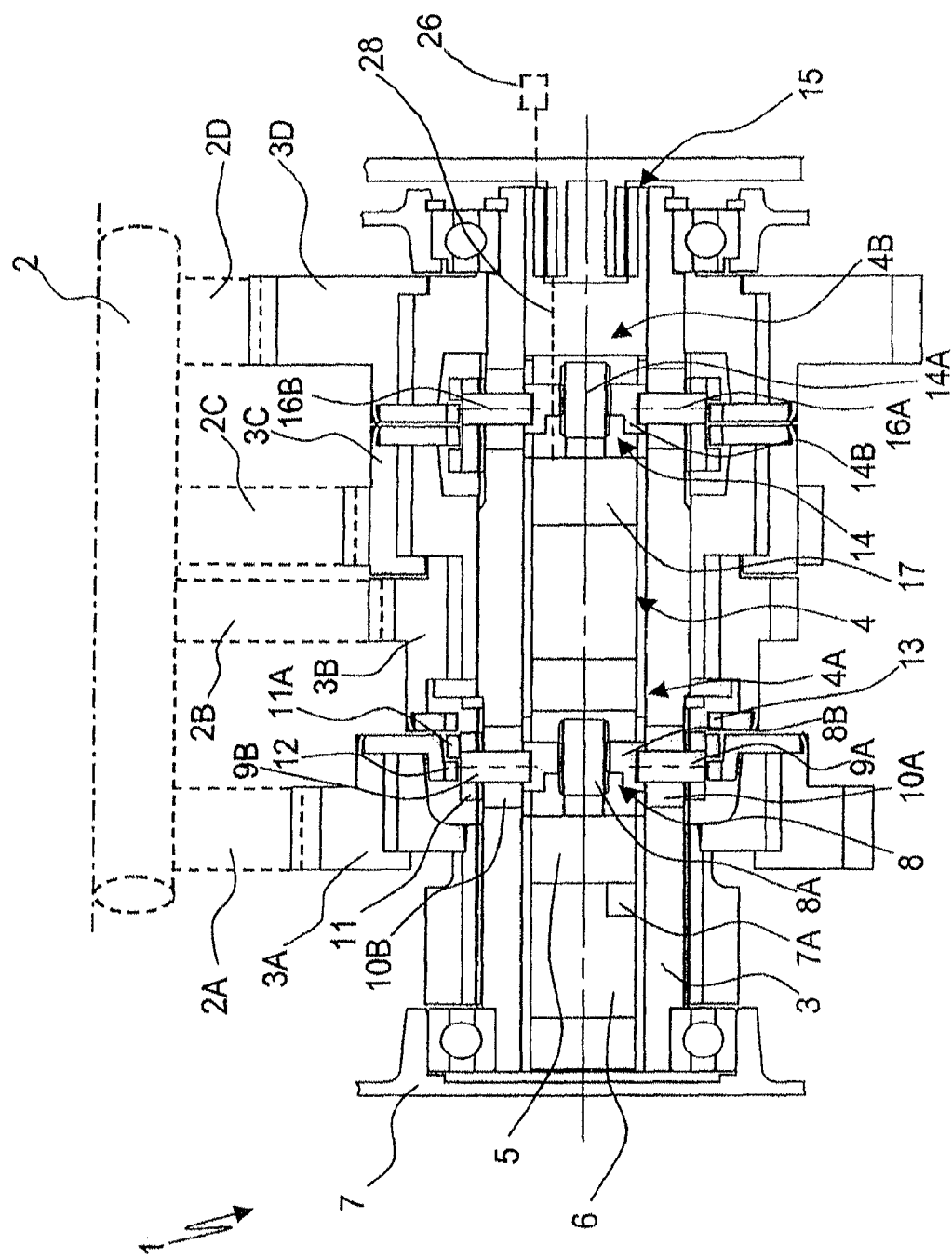
FIG. 2: Representation corresponding to that of FIG. 1, of a second example embodiment of the device according to the invention, used for engaging and disengaging loose wheels of a step-down transmission.

FIG. 2 shows a second example embodiment of a transmission device 1, which is different essentially only in the design of the device 4 for actuating the gearwheels 3A to 3D, so that in the description below essentially only the differences will be described. In the embodiment of the transmission device 1 shown in FIG. 2 the electric actuators 5 of the device 4 for actuating the loose wheels 3A to 3D are connected in a fixed manner to the countershaft 3 and therefore, during the operation of the transmission device 1, they rotate at the speed of the countershaft 3. Accordingly, no longer is any mechanical speed decoupling needed in the area between the spindle nuts 8B and 14B and the bolts 9A, 9B and 16A, 16B.

Energy and/or control signal transmission between components 26 provided outside the countershaft 3 and fixed on the housing and the actuators 5 and 17 connected in a rotationally fixed manner to the countershaft 3, is in this case carried out by a rotary transmitter 15 that works on the induction principle. By means of the inductive rotary transmitter 15 both the drive energy needed for driving the electric actuators 5 and 17, and also the necessary two-directional control signals 28, i.e. nominal and actual values, are exchanged with no contact. Alternatively to the inductive transmission of the energy and the control signals, these can also be transferred by an appropriate sliding contact system.

Both of the engaging devices 4A and 4B are parts of a module which can be inserted in its entirety into the inside of the countershaft 3 during assembly. For this, during assembly a rotation of the module, preferably by 900 to its axial end position is provided for, in order to form a connection between the spindle nuts 8B and 14B and the pins 9A, 9B and 16A, 16B respectively. Then the module is connected in a rotationally fixed manner to the countershaft 3 by suitable means such as a clip connection, a screw connection, a pin connection, a bonding connection or by wedging.

In a further advantageous design of the device according to the invention the device is made with only one electric actuator for applying the actuation force for the engagement or disengagement of a component or gearwheel, this being a so-termed dedicated selection actuator. By means of the selection actuator a choice can be made between the various components or gearwheels to be actuated, so that by means of the selection actuator a selected gearwheel or component, or the shift element associated with it, is acted upon by the actuation energy produced by the electric actuator.

The selection actuator is in this case preferably made as a shift magnet, which produces the connection between the electric actuator of the device and the component or gearwheel to be actuated by the device that is necessary for the component or gearwheel, or the shift element associated with it, to be actuated.

In general the device described above is also suitable for other self-reinforcing systems such as wedge brakes or wedge clutches, so that the system provided for actuating the elements can simply be made as a module and fitted in an appropriate position.

INDEXES

1 Transmission device
2 Main transmission shaft
2A to 2D Gearwheels
3 Countershaft
3A to 3D Gearwheels
4 Device
4A, 4B Engaging devices
5 Electric actuator
6 Control and power electronic unit
7 Housing component
7A Energy accumulator
8 Spindle-nut arrangement
8A Spindle
8B Nut
9A, B Pins
10A, B Slot
11 Sleeve element
11A Toothed profile
12 Toothed profile
13 Toothed profile
14 Spindle-nut arrangement
14A Spindle
14B Nut
15 Rotary transmitter
16A, B Pins
17 Actuator

The invention claimed is:

1. A device (4) for actuating a component mounted to rotate on a shaft (3), the device comprising:
   an engaging device (4A, 4B) that is axially movable along the shaft (3) within a slot (10B) in the shaft (3) by at least one electric actuator (5, 17) between at least first and second axial positions;
   the component has a profile and is spaced from the shaft (3);
   the engaging device (4A, 4B) comprises a profile and extends radially through the slot (10B) in the shaft (3) and, in the first axial position, the profile of the engaging device (4A, 4B) is located within the component, and the profile of the engaging device (4A, 4B) engages the profile of the component such that the component is rotationally fixed to the shaft (3);

in the second axial position of the electric actuator (5, 17), the profile of the engaging device (4A, 4B) is disengaged from the profile of the component;

the at least one electric actuator (5, 17) is arranged at least partially inside and coaxially with the shaft (3);

wherein the electric actuator (5, 17) is nonrotatably connected to a housing component (7) and the shaft (3) is rotationally supported by the housing component (7) such that the shaft (3) rotates with respect to the electric actuator (5, 17) and the housing component (7).

2. The device according to claim 1, wherein the engaging device (4A, 4B) comprises a drive converter device (8, 14) and is located between the actuator (5, 17) and the component, the drive converter device (8, 14) converts rotary drive from the actuator (5, 17) to translational drive movement.

3. The device according to claim 2, wherein the drive converter device (8, 14) is a spindle-nut arrangement with or without self-locking.

4. The device according to claim 2, wherein a transmission is arranged in a direction of drive power flow between the actuator and the drive converter device.

5. The device according to claim 1, wherein the electric actuator (5, 17) is an electric motor by which an existing shift status of the component can be maintained.

6. The device according to claim 1, wherein the actuator (5, 17) applies a detent torque to maintain a shift status of the component.

7. The device according to claim 1, wherein the actuator (5, 17) is at least controlled and regulated as a function of at least one of an existing shift status of the engaging device (4A, 4B), associated with the component, and an actual drive power.

8. The device according to claim 1, wherein a plurality of actuators (5, 17) are combined in a module.

9. The device according to claim 1, wherein at least one of an electronic power unit and a control unit (6), associated with the electric actuator (5, 17), is arranged at least partially inside the shaft (3).

10. The device according to claim 1, wherein at least one of an electronic power unit and a control unit (6) is combined with the electric actuator (5, 17) to form a common module.

11. The device according to claim 1, wherein an electric energy storage (7A) associated with the actuator (5) is arranged at least partially inside the shaft (3), the electric energy storage (7A) stores electric energy and supplies the actuator (5) with the electric energy.

12. The device according to claim 1, wherein a portion of the actuator is arranged inside the shaft and comprises an oil duct for the passage of hydraulic fluid.

13. The device according to claim 1, wherein the component mounted to rotate on a shaft (3) is a loose gearwheel (3A to 3D) of the transmission device (1).

14. A device (4) for actuating a component mounted to rotate on a shaft (3), the device comprising:

an engaging device (4A, 4B) that is axially movable along the shaft (3) within a slot (10B) in the shaft (3) by at least one electric actuator (5, 17) between at least first and second axial positions;

the component has a profile and is spaced from the shaft (3);

the engaging device (4A, 4B) comprises a profile and extends radially through the slot (10B) in the shaft (3) and, in the first axial position, the profile of the engaging device (4A, 4B) is located within the component, and the profile of the engaging device (4A, 4B) engages the profile of the component such that the component is rotationally fixed to the shaft (3);

in the second axial position of the electric actuator (5, 17), the profile of the engaging device (4A, 4B) is disengaged from the profile of the component;

the at least one electric actuator (5, 17) is arranged at least partially inside and coaxially with the shaft (3);

wherein an electrically controlled brake communicates with the actuator to maintain a shift status of the component by preventing a change of the shift status of the component when the actuator is not energized.

15. A device (4) for engaging a gear wheel (3A, 3B, 3C, 3D) to a hollow transmission shaft (3) such that the gear wheel and the hollow shaft are nonrotatable with respect to each other, and the gear wheel (3A, 3B, 3C, 3D), in a disengaged state, being freely rotationally supported by the hollow shaft (3), the device comprising:

an electric actuator (5, 17) is coaxially aligned with the hollow shaft (3) and located within an interior of the hollow shaft (3), the electric actuator (5, 17) rotationally actuates a spindle (8A) which engages a nut (8B), the nut (8B) is axially slidable and rotationally fixed with respect to the shaft such that the nut (8B) is axially biased within the interior of the hollow shaft (3) by rotation of the spindle (8A);

a first end of pins (9A, 9B) are immovably fixed to the nut (8B) and radially extend through slots (10A, 10B) in the hollow shaft (3);

a second opposite end of the pins is statically connected to a sleeve (11), (11) is rotationally fixed to the hollow shaft (3) and axially slidable thereon, the first end of the pins (9A, 9B) are fixed to the nut (8B) within the interior of the hollow shaft (3), such that as the nut (8B) is axially driven within the hollow shaft by rotation of the spindle (8A); and the sleeve (11) is axially slidable along the hollow shaft (3) radially between the gear wheel (3A, 3B, 3C, 3D) and the hollow shaft (3) such that in a first position, a radially exterior profile of the sleeve (11) engages a radially interior profile of the gear wheel (3A, 3B, 3C, 3D).

* * * * *